(12) United States Patent
Saunders et al.

(10) Patent No.: US 11,109,122 B1
(45) Date of Patent: Aug. 31, 2021

(54) USING FREE-SPACE OPTICS TO INTERCONNECT A PLURALITY OF COMPUTING NODES

(71) Applicant: Microsoft Technology Licensing, LLC, Redmond, WA (US)

(72) Inventors: Winston Allen Saunders, Seattle, WA (US); Christian L. Belady, Mercer Island, WA (US); Lisa Ru-Feng Hsu, Redmond, WA (US); Hitesh Ballani, Redmond, WA (US); Paolo Costa, Redmond, WA (US); Douglas M. Carmean, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/917,875

(22) Filed: Jun. 30, 2020

(51) Int. Cl.
| | |
|---|---|
| *H04Q 11/00* | (2006.01) |
| *H04B 10/11* | (2013.01) |
| *H04B 10/27* | (2013.01) |
| *H04B 10/516* | (2013.01) |
| *H04B 10/40* | (2013.01) |

(52) U.S. Cl.
CPC ......... *H04Q 11/0005* (2013.01); *H04B 10/11* (2013.01); *H04B 10/27* (2013.01); *H04B 10/40* (2013.01); *H04B 10/516* (2013.01); *H04Q 2011/0039* (2013.01); *H04Q 2011/0058* (2013.01)

(58) Field of Classification Search
CPC ........ H04B 10/11; H04B 10/27; H04B 10/40; H04B 10/516; H04Q 11/0005; H04Q 2011/0039; H04Q 2011/0058

USPC ........................................................... 398/45
See application file for complete search history.

(56) References Cited

U.S. PATENT DOCUMENTS

| | | | | |
|---|---|---|---|---|
| 5,943,150 A | * | 8/1999 | Deri ................... | H04J 14/0206 398/1 |
| 6,795,655 B1 | * | 9/2004 | Sidorovich ........ | H04B 10/1125 398/118 |
| 8,954,698 B2 | * | 2/2015 | Schenfeld ........... | G06F 12/0891 711/165 |

(Continued)

OTHER PUBLICATIONS

Cheng, et al., "Photonic switching in high performance datacenters", In Journal of Optics Express, vol. 26, No. 12, Jun. 11, 2018, pp. 16022-16043.

(Continued)

*Primary Examiner* — Dalzid E Singh
(74) *Attorney, Agent, or Firm* — Ray Quinney & Nebeker; Thomas M. Hardman; Phong Dinh (57) ABSTRACT

A system for using free-space optics to interconnect a plurality of computing nodes can include a plurality of node optical transceivers that are electrically coupled to at least some of the plurality of computing nodes. The system can also include a plurality of router optical transceivers that facilitate free-space optical communications with the plurality of node optical transceivers. Each node optical transceiver among the plurality of node optical transceivers can have a corresponding router optical transceiver that is optically coupled to the node optical transceiver. The system can also include a router that is coupled to the plurality of router optical transceivers. The router can be configured to route the free-space optical communications among the plurality of computing nodes.

16 Claims, 5 Drawing Sheets

(56) References Cited

U.S. PATENT DOCUMENTS

| | | | | |
|---|---|---|---|---|
| 9,332,323 B2* | 5/2016 | Zhang | ............... | H04J 14/0216 |
| 9,520,961 B2* | 12/2016 | Xia | ................... | H04J 14/0269 |
| 9,696,538 B2* | 7/2017 | Katayama | .......... | G02B 26/0816 |
| 9,712,901 B2* | 7/2017 | Zhang | ............... | H04Q 11/0071 |
| 10,552,227 B2* | 2/2020 | Altstaetter | ............. | G06F 15/80 |
| 2003/0091267 A1* | 5/2003 | Alvarez | ............. | H04Q 11/0005 |
| | | | | 385/16 |
| 2005/0013311 A1* | 1/2005 | Samudrala | ........... | H04L 49/101 |
| | | | | 370/412 |
| 2012/0124590 A1* | 5/2012 | Balakrishnan | .......... | G06F 1/206 |
| | | | | 718/103 |
| 2013/0156425 A1* | 6/2013 | Kirkpatrick | .......... | H04B 10/801 |
| | | | | 398/45 |
| 2013/0287397 A1* | 10/2013 | Frankel | ............... | H04J 14/0213 |
| | | | | 398/50 |
| 2016/0091685 A1* | 3/2016 | Raza | ................... | G02B 6/4452 |
| | | | | 398/19 |

OTHER PUBLICATIONS

Kachris, et al., "A Survey on Optical Interconnects for Data Centers", In Journal of IEEE Communications Surveys & Tutorials, vol. 14, Issue 4, Jan. 11, 2012, pp. 1021-1036.

Shrivastav, et al., "Shoal: A Network Architecture for Disaggregated Racks", In 16th {USENIX} Symposium on Networked Systems Design and Implementation, 2019, 16 pages.

* cited by examiner

USING FREE-SPACE OPTICS TO INTERCONNECT A PLURALITY OF COMPUTING NODES

CROSS-REFERENCE TO RELATED APPLICATIONS

N/A

BACKGROUND

A datacenter is a physical facility that is used to house computer systems and associated components. A datacenter typically includes a large number of servers, which can be stacked in racks that are placed in rows.

One relatively recent development in datacenter technology involves disaggregation. Currently, most datacenters include a plurality of servers, with each server including one or more central processing units (CPUs) and a certain amount of memory. Disaggregation involves separating servers into their constituent processing and memory resources so that these can be allocated as required according to the needs of each workload.

Separating servers into resource components can provide additional flexibility. Workloads, especially in commercial datacenters, can vary greatly. One of the primary goals of datacenter operation is having enough resources to cover peak demand, yet not under-utilize those same resources during non-peak conditions. Disaggregation increases the chances of being able to supply sufficient resources during time periods of high demand while also ensuring optimal utilization.

In order to achieve disaggregation, the interconnections between the computing resources should provide high bandwidth and low latency, similar to the high bandwidth and low latency provided by the communication interfaces inside a traditional server. This can be a challenge for a datacenter that has a large number of computing nodes that should be interconnected.

SUMMARY

In accordance with one aspect of the present disclosure, a system is disclosed for using free-space optics to interconnect a plurality of computing nodes. The system includes a plurality of node optical transceivers that are electrically coupled to at least some of the plurality of computing nodes. The system also includes a router that is configured to communicate with the plurality of computing nodes via free-space optical communications. The system also includes a plurality of router optical transceivers that are coupled to the router. The plurality of router optical transceivers are distinct from the plurality of node optical transceivers. Optical transmissions between the plurality of router optical transceivers and the plurality of node optical transceivers enable the free-space optical communications between the router and the plurality of computing nodes. The system also includes a plurality of light sources. The plurality of light sources comprise at least one distinct light source for each node optical transceiver among the plurality of node optical transceivers and for each router optical transceiver among the plurality of router optical transceivers. The system also includes a plurality of photodetectors. The plurality of photodetectors comprise at least one distinct photodetector for each node optical transceiver among the plurality of node optical transceivers and for each router optical transceiver among the plurality of router optical transceivers.

The plurality of node optical transceivers, the plurality of router optical transceivers, and the router may interconnect the plurality of computing nodes to form a network fabric. The plurality of computing nodes may be accessible to one another via the network fabric.

The plurality of computing nodes may include a plurality of processing nodes and a plurality of memory nodes. The plurality of processing nodes may not be electrically coupled to all of the plurality of memory nodes. All of the plurality of memory nodes may be accessible to all of the plurality of processing nodes via the network fabric.

The plurality of node optical transceivers may not be electrically coupled to the router. The plurality of router optical transceivers may not be electrically coupled to the plurality of computing nodes.

A first computing node may be electrically coupled to a first node optical transceiver. A first router optical transceiver may be optically coupled to the first node optical transceiver. A second computing node may be electrically coupled to a second node optical transceiver. A second router optical transceiver may be optically coupled to the second node optical transceiver. The first router optical transceiver may be configured to receive a first modulated light beam from the first node optical transceiver and demodulate the first modulated light beam to extract data. The router may be configured to route the data to the second router optical transceiver. The second router optical transceiver may be configured to transmit a second modulated light beam to the second node optical transceiver. The second modulated light beam may include the data.

The router may include at least one of an electrical crossbar switch that performs routing operations, a microelectromechanical systems (MEMS) device that performs the routing operations, and a prism that performs the routing operations.

In accordance with another aspect of the present disclosure, a system is disclosed for using free-space optics to interconnect a plurality of computing nodes. The system includes a router that is configured to communicate with the plurality of computing nodes via free-space optical communications. The system also includes a plurality of optical modules that are electrically coupled to at least some of the plurality of computing nodes. The system also includes a plurality of optical transceivers that are coupled to the router. The plurality of optical transceivers facilitate free-space optical communications with the plurality of optical modules. Each optical module among the plurality of optical modules has a corresponding optical transceiver that is optically coupled to the optical module. The system also includes a first plurality of light sources that are separate from the plurality of optical modules and that enable the free-space optical communications from the router to the plurality of optical modules. The system also includes a second plurality of light sources that are separate from the plurality of optical modules and that enable the free-space optical communications from the plurality of optical modules to the router.

Each optical module among the plurality of optical modules may include a modulator and an optics system. The modulator within a particular optical module may be configured to modulate a light beam received from one of the second plurality of light sources to produce a modulated light beam. The optics system within the particular optical module may be configured to direct the modulated light beam toward the router. In some embodiments, the plurality of optical modules do not comprise any light sources.

The plurality of optical modules, the plurality of optical transceivers, and the router may interconnect the plurality of computing nodes to form a network fabric. The plurality of computing nodes may include a plurality of processing nodes and a plurality of memory nodes. The plurality of processing nodes may not be electrically coupled to all of the plurality of memory nodes. All of the plurality of memory nodes may be accessible to all of the plurality of processing nodes via the network fabric.

A first computing node may be electrically coupled to a first optical module. A first optical transceiver may be optically coupled to the first optical module. A second computing node may be electrically coupled to a second optical module. A second optical transceiver may be optically coupled to the second optical module. The first optical transceiver may be configured to receive a first modulated light beam from the first optical module and demodulate the first modulated light beam to extract data. The router may be configured to route the data to the second optical transceiver. The second optical transceiver may be configured to transmit a second modulated light beam to the second optical module. The second modulated light beam may include the data.

In accordance with another aspect of the present disclosure, a system is disclosed for using free-space optics to interconnect a plurality of computing nodes that are located within an enclosure. The system includes a router that is configured to route free-space optical communications among the plurality of computing nodes. The system also includes a plurality of processing nodes in a first zone of the enclosure. The system also includes a plurality of optical modules that are electrically coupled to at least some of the plurality of computing nodes. The system also includes a plurality of memory nodes in a second zone of the enclosure. Each memory node among the plurality of memory nodes may be electrically coupled to at least one processing node among the plurality of processing nodes. The system also includes a plurality of optical transceivers that are coupled to the router. The plurality of optical transceivers facilitate free-space optical communications with the plurality of optical modules. Each optical module among the plurality of optical modules has a corresponding optical transceiver that is optically coupled to the optical module. The system also includes at least one light source that is positioned outside of the first zone of the enclosure and that is configured to transmit light beams toward the plurality of optical modules.

A first temperature of the first zone of the enclosure may be lower than a second temperature of the second zone of the enclosure.

The plurality of optical modules may be located in the first zone of the enclosure.

The plurality of optical modules may be located in a third zone of the enclosure.

A first temperature of the first zone of the enclosure may be lower than a second temperature of the second zone of the enclosure. The second temperature may be lower than a third temperature of the third zone of the enclosure.

The plurality of optical modules, the plurality of optical transceivers, and the router may interconnect the plurality of computing nodes to form a network fabric. The plurality of computing nodes may be accessible to one another via the network fabric.

The plurality of processing nodes may not be electrically coupled to all of the plurality of memory nodes. All of the plurality of memory nodes may be accessible to all of the plurality of processing nodes via the network fabric.

Each optical module among the plurality of optical modules may include a modulator and an optics system. The modulator within a particular optical module may be configured to modulate a light beam received from the at least one light source to produce a modulated light beam. The optics system within the particular optical module may be configured to direct the modulated light beam toward an optical transceiver among the plurality of optical transceivers.

A first computing node may be electrically coupled to a first optical module. A first optical transceiver may be optically coupled to the first optical module. A second computing node may be electrically coupled to a second optical module. A second optical transceiver may be optically coupled to the second optical module. The first optical transceiver may be configured to receive a first modulated light beam from the first optical module and demodulate the first modulated light beam to extract data. The router may be configured to route the data to the second optical transceiver. The second optical transceiver may be configured to transmit a second modulated light beam to the second optical module. The second modulated light beam may include the data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The present disclosure is generally related to interconnecting a plurality of computing resources in a way that provides high bandwidth and low latency. This can be useful in various kinds of computing systems, including disaggregated computing systems.

One type of network topology that can be used to provide high bandwidth and low latency interconnections between computing resources is sometimes referred to as a network fabric. In this type of architecture, computing resources can be deployed in a relatively small number of highly interconnected layers. Unlike traditional multi-tier architectures, a network fabric effectively flattens the network architecture, thereby reducing the distance between endpoints.

In theory, a network fabric that provides high bandwidth and low latency can be achieved using wired connections. However, in a datacenter that includes a large number of computing nodes, a massive number of wired connections would be required to provide this kind of network topology. Therefore, it is impractical to use wired connections to interconnect a large number of computing nodes in a way that provides high bandwidth and low latency.

The present disclosure proposes the use of free-space optics to create a network fabric that interconnects a large number of computing nodes. Free-space optics is an optical communication technology that uses light propagating in free space to transmit data between two points. Free-space optical communications am typically carried out with two systems that each include an optical transceiver. An optical transceiver can include an optical transmitter and an optical transceiver to provide full duplex (bi-directional) capability. An optical transmitter can include a light source (e.g., a laser, a light-emitting diode, an infrared-remitting diode) and a modulator. The modulator can be configured to vary one or more properties of the light beams that are produced by the light source with a modulating signal that includes data to be transmitted. Modulated light beams can be transmitted through the atmosphere to the optical receiver. An optical receiver can include a photodetector and a demodulator. The photodetector can be configured to convert the modulated light beams into an electrical signal, and the demodulator can be configured to demodulate the electrical signal in order to extract the transmitted data.

In some embodiments, to interconnect a plurality of computing nodes using free-space optics, at least some of the computing nodes can be electrically coupled to optical transceivers. In addition, a router can be provided. The router can be coupled to a plurality of optical transceivers.

Free-space optical communications can occur between the optical transceivers that are electrically coupled to the computing nodes and the optical transceivers that are coupled to the router. In some embodiments, for each optical transceiver that is coupled to a particular computing node, there is a corresponding optical transceiver at the router. Free-space optical communications that are sent by an optical transceiver at a computing node can be received by the corresponding optical transceiver at the router, and vice versa.

The router can be configured to route free-space optical communications among the computing nodes in the system. In other words, different computing nodes can communicate with each other through the router. Thus, the router, the optical transceivers coupled to the router, and the optical transceivers coupled to the computing nodes can all function together to interconnect the computing nodes so as to form a network fabric.

Advantageously, the use of free-space optics enables the network fabric to have high bandwidth and low latency. In some embodiments, the bandwidth and latency of a network fabric that utilizes free-space optics in accordance with the techniques disclosed herein can be similar to the high bandwidth and low latency provided by the interconnections between CPUs and memory in a traditional server. At the same time, the use of free-space optics eliminates the need to utilize a massive number of wired connections to achieve the desired high bandwidth and low latency, which is impractical (as noted above).

In some embodiments, the techniques disclosed herein can be utilized in a disaggregated computing system. In a disaggregated computing system, computing resources can be separated into dedicated nodes, such as processing nodes, memory nodes, storage nodes, etc. The various types of nodes that are utilized in a computing system may be referred to herein generally as computing nodes. In a disaggregated system, the term "computing node" can refer to a processing node, a memory node, a storage node, and/or another type of node that is utilized by a computing system.

Figure 1:
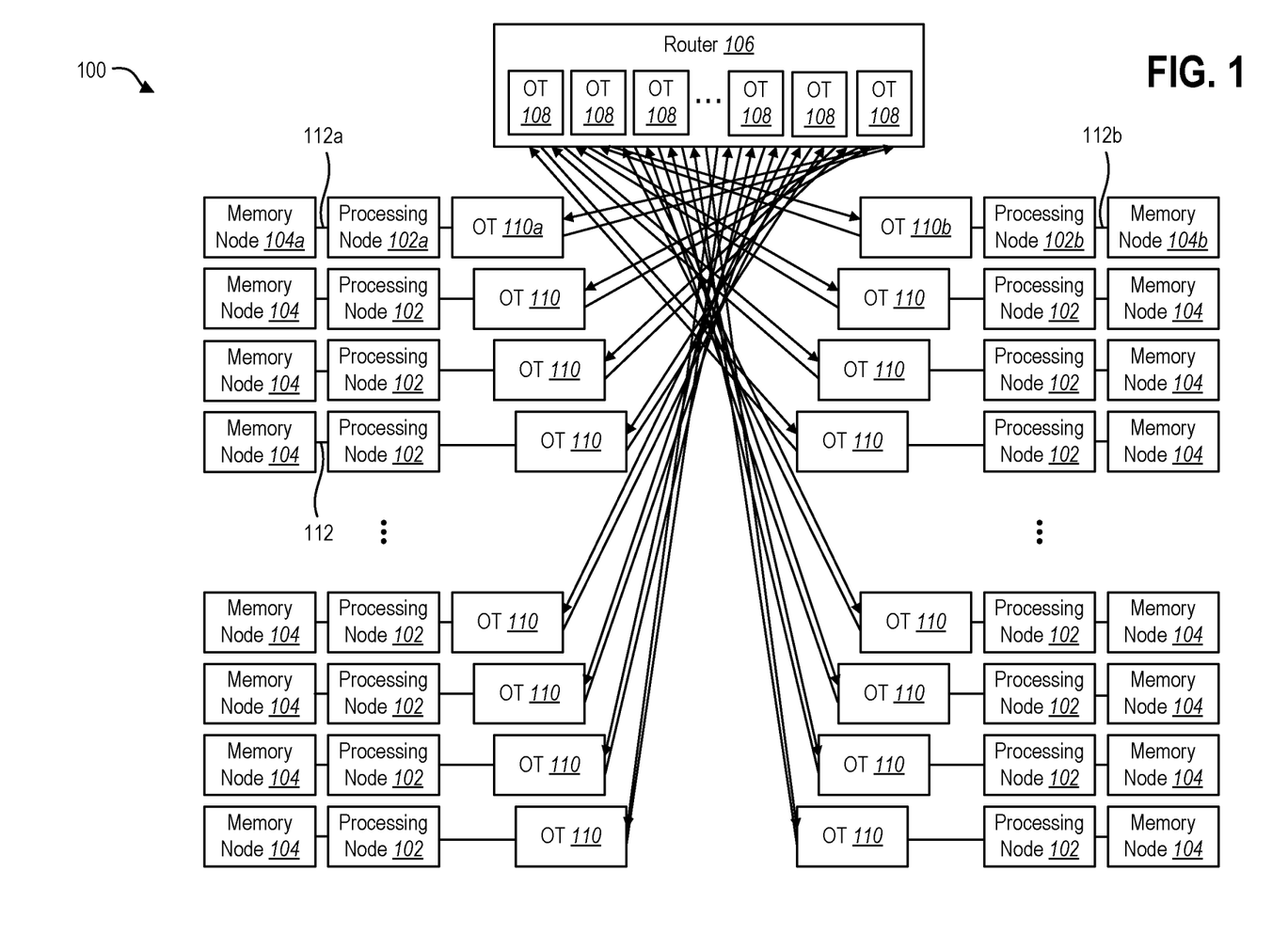
FIG. 1 illustrates an example of a system for using free-space optics to interconnect a plurality of computing nodes in accordance with the present disclosure.

FIG. 1 illustrates an example of a system 100 in which the techniques disclosed herein can be utilized. The system 100 is a disaggregated computing system that includes a plurality of computing nodes. In particular, the system 100 is shown with a plurality of processing nodes 102 and a plurality of memory nodes 104.

The system 100 also includes a plurality of optical transceivers. At least some of the computing nodes can be electrically coupled to optical transceivers. The system 100 also includes a router 106 that is configured to route free-space optical communications among the plurality of computing nodes. The router 106 can be coupled to a plurality of optical transceivers corresponding to at least some of the computing nodes.

To distinguish the optical transceivers that are coupled to the router 106 from the optical transceivers that are coupled to the computing nodes, the optical transceivers that are coupled to the router may be referred to herein as router optical transceivers 108, and the optical transceivers that are coupled to the computing nodes may be referred to herein as node optical transceivers 110. The router optical transceivers 108 and the node optical transceivers 110 are abbreviated as "OT" in FIG. 1.

The node optical transceivers 110, the router optical transceivers 108, and the router 106 can all function together to interconnect the computing nodes so as to form a network fabric. The network fabric enables all of the computing nodes to be accessible to one another.

As discussed above, the use of free-space optics to construct the network fabric eliminates the need to provide wired connections between the computing nodes. This is highly beneficial because, as noted above, providing wired connections between the computing nodes can be impractical when there are a large number of computing nodes in the system 100. The use of free-space optics to construct the network fabric also enables the network fabric to have high bandwidth and low latency, similar to the high bandwidth and low latency provided by the interconnections between CPUs and memory in a traditional server.

Free-space optical communications can occur between the node optical transceivers 110 and the router optical transceivers 108. In some embodiments, the system 100 can be configured so that for each node optical transceiver 110 there is a corresponding router optical transceiver 108 at the router 106 that is optically coupled to the node optical transceiver 110. Free-space optical communications that are sent by a particular node optical transceiver 110 can be received by the corresponding router optical transceiver 108, and vice versa.

The router 106 can be coupled to the router optical transceivers 108. In some embodiments, the router 106 can be electrically coupled to the router optical transceivers 108. In some embodiments, the router 106 can be optically coupled to the router optical transceivers 108. In FIG. 1, the router optical transceivers 108 are shown as being part of the router 106. In some alternative embodiments, however, the router optical transceivers 108 can be separate from (and still coupled to) the router 106.

The router 106 can be configured to route free-space optical communications among the computing nodes in the system 100. In other words, different computing nodes (e.g., processing nodes 102, memory nodes 104) can communicate with each other through the router 106.

Figure 2:
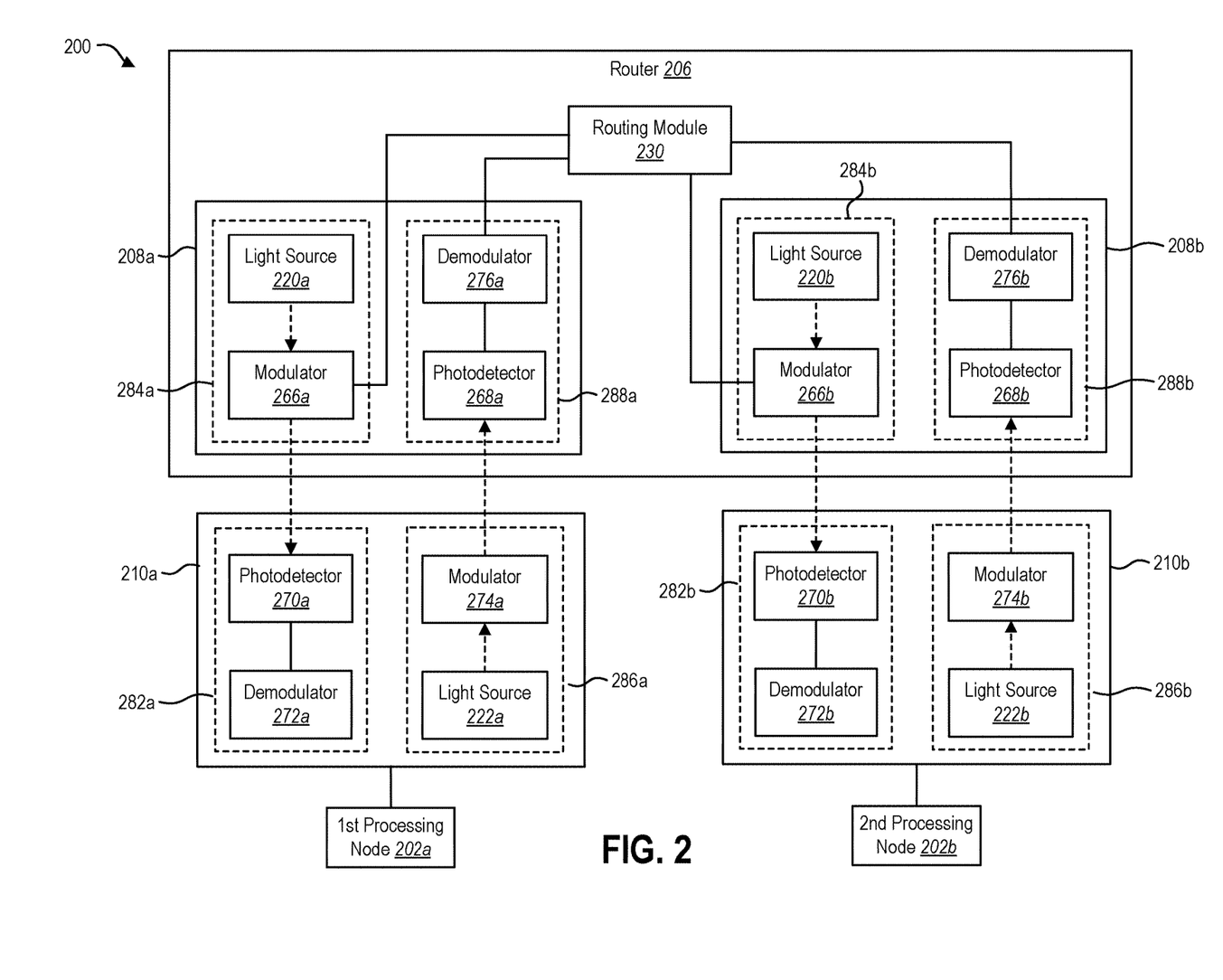
FIG. 2 illustrates an example showing how free-space optical communication can occur between a first processing node and a second processing node in a system that is configured like the system shown in FIG. 1.

For example, consider a scenario in which a first processing node 102a sends some type of communication to a second processing node 102b. In some embodiments, a first node optical transceiver 110a that is electrically coupled to the first processing node 102a can generate a modulated light beam that includes the information that should be communicated to the second processing node 102b. The first node optical transceiver 110a can transmit the modulated light beam to the router optical transceiver 110 corresponding to the first node optical transceiver 110a. The router 106 can determine (e.g., based on information contained in the modulated light beam) that the information should be delivered to the second processing node 102b. The router 106 can then cause the router optical transceiver 110 corresponding to the second node optical transceiver 110b to transmit the information to the second node optical transceiver 110b. An example showing how this communication can occur will be described below in connection with FIGS. 2A and 2B.

As indicated above, the network fabric formed by the node optical transceivers 110, the router optical transceivers 108, and the router 106 enables all of the computing nodes to be accessible to one another. For example, all of the memory nodes 104 can be accessible to all of the processing nodes 102 via the network fabric.

More specifically, in the system 100 shown in FIG. 1, each processing node 102 is electrically coupled to a memory node 104 via a direct electrical connection 112. A direct electrical connection 112 between a processing node 102 and a memory node 104 can be, for example, a wired connection. A processing node 102 can access the memory node 104 to which it is electrically coupled via this direct electrical connection 112. For example, the first processing node 102a can access the first memory node 104a via a direct electrical connection 112a between the first processing node 102a and the first memory node 104a. Similarly, the second processing node 102b can access the second memory node 104b via a direct electrical connection 112b between the second processing node 102b and the second memory node 104b.

In the depicted system 100, however, the processing nodes 102 are not electrically coupled to all of the memory nodes 104. In other words, there is not a direct electrical connection (e.g., a wired connection) between each processing node 102 and all of the memory nodes 104 in the system 100. For example, it is not possible for the first processing node 102a to access the second memory node 104b via a direct electrical connection. Similarly, it is not possible for the second processing node 102b to access the first memory node 104a via a direct electrical connection.

Although there is not a direct electrical connection between each processing node 102 and all of the memory nodes 104, the network fabric that is formed by the node optical transceivers 110, the router optical transceivers 108, and the router 106 makes all of the memory nodes 104 accessible to all of the processing nodes 102. For example, the first processing node 102a can access the second memory node 104b (as well as all of the other memory nodes 104 in the system 100) via the network fabric. Similarly, the second processing node 102b can access the first memory node 104a (as well as all of the other memory nodes 104 in the system 100) via the network fabric. Therefore, even though the processing nodes 102 are not electrically coupled to all of the memory nodes 104 in the system 100, the processing nodes 102 are either electrically coupled or optically coupled to all of the memory nodes 104 in the system 100. Moreover, as discussed above, the use of free-space optics to construct the network fabric enables the network fabric to have high bandwidth and low latency, similar to the high bandwidth and low latency provided by the interconnections between CPUs and memory in a traditional server.

The system 100 shown in FIG. 1 is provided for purposes of example only, and the specific characteristics of the system 100 should not be interpreted as limiting the scope of the present disclosure. The techniques disclosed herein can be utilized in other systems with characteristics that are different from those in the depicted system 100.

For example, in the depicted system 100, one node optical transceiver 110 is coupled to each processing node 102. In some embodiments, however, more than one node optical transceiver 110 can be coupled to each processing node 102. Similarly, there can be more than one router optical transceiver 108 that corresponds to each processing node 102 (or other type of computing node).

As another example, only processing nodes 102 and memory nodes 104 are shown in the depicted system 100. In alternative embodiments, however, other types of computing nodes (e.g., storage nodes) can be utilized.

As another example, in the depicted system 100 each processing node 102 is electrically coupled (e.g., has a direct electrical connection 112) to only one memory node 104. In alternative embodiments, however, at least some processing nodes can be electrically coupled to more than one memory node and/or not be electrically coupled to any separate memory nodes.

As another example, in the depicted system 100 each processing node 102 is electrically coupled to a node optical transceiver 110, and each node optical transceiver 110 can include a light source for generating light beams that can be modulated and transmitted to the router optical transceivers 108. In some alternative embodiments, however, the processing nodes may not be electrically coupled to optical transceivers that include light sources. This will be discussed in greater detail below.

As another example, the depicted system 100 is a disaggregated computing system in which computing resources are separated into dedicated nodes (e.g., processing nodes 102, memory nodes 104). However, the scope of the present disclosure is not limited to disaggregated computing systems. The techniques disclosed herein for utilizing free-space optics to interconnect computing nodes can be implemented in a system that includes a plurality of traditional servers.

FIG. 2 illustrates an example showing how free-space optical communications can occur among a plurality of computing nodes. The example will be described in relation to a system that is configured like the system 100 shown in FIG. 1. The various components shown in FIG. 2 are examples of possible implementations of the corresponding components in the system 100 shown in FIG. 1.

For the sake of simplicity, the depicted example involves communication between a first processing node 202a and a second processing node 202b. The first processing node 202a is coupled to a first node optical transceiver 210a, and the second processing node 202b is coupled to a second node optical transceiver 210b. The router 206 includes a plurality of router optical transceivers, including a first router optical transceiver 208a and a second router optical transceiver 208b. For purposes of the present example, it will be assumed that the first router optical transceiver 208a is optically coupled to the first node optical transceiver 210a, and the second router optical transceiver 208b is optically coupled to the second node optical transceiver 210b.

The first node optical transceiver 210a and the second node optical transceiver 210b can both include a receiving module that is configured to receive free-space optical communications from the router 206. In particular, the first node optical transceiver 210a can include a receiving module 282a, and the second node optical transceiver 210b can include a receiving module 282b. The receiving module 282a in the first node optical transceiver 210a can include a photodetector 270a and a demodulator 272a. The receiving module 282b in the second node optical transceiver 210b can include a photodetector 270b and a demodulator 272b.

The first router optical transceiver 208a and the second router optical transceiver 208b can both include a transmitting module that is configured to transmit free-space optical communications to the first node optical transceiver 210a and the second node optical transceiver 210b, respectively. In particular, the first router optical transceiver 208a can include a transmitting module 284a, and the second router optical transceiver 208b can include a transmitting module 284b. The transmitting module 284a in the first router optical transceiver 208a can include a light source 220a and a modulator 266a. The transmitting module 284b in the second router optical transceiver 208b can include a light source 220b and a modulator 266b.

The transmitting module 284a in the first router optical transceiver 208a and the receiving module 282a in the first node optical transceiver 210a can enable the router 206 to send data to the first processing node 202a. More specifically, the light source 220a in the first router optical transceiver 208a can generate a light beam that is aimed at the photodetector 270a in the first node optical transceiver 210a. The light beam can be modulated by the modulator 266a based on a modulating signal that includes the data to be transmitted. The photodetector 270a in the first node optical transceiver 210a can detect the modulated light beam and convert it into an electrical signal. The demodulator 272a in the first node optical transceiver 210a can be configured to extract the data from the electrical signal that is produced by the photodetector 270a. This data can then be provided to the first processing node 202a.

In a similar manner, the transmitting module 284b in the second router optical transceiver 208b and the receiving module 282b in the second node optical transceiver 210b can enable the router 206 to send data to the second processing node 202b. More specifically, the light source 220b in the second router optical transceiver 208b can generate a light beam that is aimed at the photodetector 270b in the second node optical transceiver 210b. The light beam can be modulated by the modulator 266b based on a modulating signal that includes the data to be transmitted. The photodetector 270b in the second node optical transceiver 210b can detect the modulated light beam and convert it into an electrical signal. The demodulator 272b in the second node optical transceiver 210b can be configured to extract the data from the electrical signal that is produced by the photodetector 270b. This data can then be provided to the second processing node 202b.

The first node optical transceiver 210a and the second node optical transceiver 210b can both include a transmitting module that is configured to send free-space optical communications to the router 206. In particular, the first node optical transceiver 210a can include a transmitting module 286a, and the second node optical transceiver 210b can include a transmitting module 286b. The transmitting module 286a in the first node optical transceiver 210a can include a light source 222a and a modulator 274a. Similarly, the transmitting module 286b in the second node optical transceiver 210b can include a light source 222b and a modulator 274b.

The first router optical transceiver 208a and the second router optical transceiver 208b can both include a receiving module that is configured to receive free-space optical communications from the first node optical transceiver 210a and the second node optical transceiver 210b, respectively. In particular, the first router optical transceiver 208a can include a receiving module 288a, and the second router optical transceiver 208b can include a receiving module 288b. The receiving module 288a in the first router optical transceiver 208a can include a photodetector 268a and a demodulator 276a. The receiving module 288b in the second router optical transceiver 208b can include a photodetector 268b and a demodulator 276b.

The transmitting module 286a in the first node optical transceiver 210a and the receiving module 288a in the first router optical transceiver 208a can enable the first processing node 202a to send data to the router 206. More specifically, the light source 222a in the first node optical transceiver 210a can generate a light beam that is aimed at the photodetector 268a in the first router optical transceiver 208a. The light beam can be modulated by the modulator 274a based on a modulating signal that includes the data to be transmitted. The photodetector 268a in the first router optical transceiver 208a can detect the modulated light beam and convert it into an electrical signal. The demodulator 276a in the first router optical transceiver 208a can be configured to extract the data from the electrical signal that is produced by the photodetector 268a. This data can then be provided to a routing module 230 within the router 206.

The transmitting module 286b in the second node optical transceiver 210b and the receiving module 288b in the second router optical transceiver 208b can enable the second processing node 202b to send data to the router 206. More specifically, the light source 222b in the second node optical transceiver 210b can generate a light beam that is aimed at the photodetector 268b in the second router optical transceiver 208b. The light beam can be modulated by the modulator 274b based on a modulating signal that includes the data to be transmitted. The photodetector 268b in the second router optical transceiver 208b can detect the modulated light beam and convert it into an electrical signal. The demodulator 276b in the second router optical transceiver 208b can be configured to extract the data from the electrical signal that is produced by the photodetector 268b. This data can then be provided to the routing module 230 within the router 206.

An example involving a communication from the first processing node 202a to the second processing node 202b will now be described. In this example, it will be assumed that the first processing node 202a has data to send to the second processing node 202b.

When the first processing node 202a has data to send to the second processing node 202b, the transmitting module 286a in the first node optical transceiver 210a can send the data to the receiving module 288a in the first router optical transceiver 208a in the manner described above. Along with the data, the transmitting module 286a can also send the receiving module 288a an indication of the intended destination for the data, which is the second processing node 202b in this example. The receiving module 288a can provide the data and the indication of the intended destination for the data to the routing module 230. The routing module 230 can then provide the data to the optical transceiver that corresponds to the intended destination for the data, which in this example is the second router optical transceiver 208b. The transmitting module 284b in the second router optical transceiver 208b can send the data to the receiving module 282b in the second node optical transceiver 210b in the manner described above. The second node optical transceiver 210b can then provide the data to the second processing node 202b.

The second processing node 202b can also send data to the first processing node 202a in a similar manner. When the second processing node 202b has data to send to the first processing node 202a, the transmitting module 286b in the second node optical transceiver 210b can send the data to the receiving module 288b in the second router optical transceiver 208b in the manner described above. Along with the data, the transmitting module 286b can also send the receiving module 288b an indication of the intended destination for the data, which is the first processing node 202a in this example. The receiving module 288b can provide the data and the indication of the intended destination for the data to the routing module 230. The routing module 230 can then provide the data to the optical transceiver that corresponds to the intended destination for the data, which in this example is the first router optical transceiver 208a. The transmitting module 284a in the first router optical transceiver 208a can send the data to the receiving module 282a in the first node optical transceiver 210a in the manner described above. The first node optical transceiver 210a can then provide the data to the first processing node 202a.

In the example shown in FIG. 2, there is two-way communication between the router 206 and each processing node. Communication from the router 206 to the first processing node 202a occurs from the transmitting module 284a in the first router optical transceiver 208a to the receiving module 282a in the first node optical transceiver 210a. Communication from the first processing node 202a to the router 206 occurs from the transmitting module 286a in the first node optical transceiver 210a to the receiving module 288a in the first router optical transceiver 208a. Communication from the router 206 to the second processing node 202b occurs from the transmitting module 284b in the second router optical transceiver 208b to the receiving module 282b in the second node optical transceiver 210b. Communication from the second processing node 202b to the router 206 occurs from the transmitting module 286b in the second node optical transceiver 210b to the receiving module 288b in the second router optical transceiver 208b.

In some embodiments, the transmitting module in a particular optical transceiver is optically aligned with the receiving module in a corresponding optical transceiver. In the example shown in FIG. 2, the transmitting module 284a in the first router optical transceiver 208a is optically aligned with the receiving module 282a in the first node optical transceiver 210a. The transmitting module 286a in the first node optical transceiver 210a is optically aligned with the receiving module 288a in the first router optical transceiver 208a. The transmitting module 284b in the second router optical transceiver 208b is optically aligned with the receiving module 282b in the second node optical transceiver 210b. The transmitting module 286b in the second node optical transceiver 210b is optically aligned with the receiving module 288b in the second router optical transceiver 208b.

In some embodiments, the light sources 220a-b, 222a-b can remain powered on all the time (or substantially all the time). The modulators 266a-b, 274a-b can be activated when there is data to send. When a particular processing node has data to send to another processing node, the processing node that has data to send can initiate communication with the router 206 (if the processing node is not already in communication with the router 206). The processing node that has data to send can request access to send the data through the router 206.

In some embodiments, the node optical transceivers 210a-b shown in FIG. 2 can be representative of the node optical transceivers 110 shown in FIG. 1. In other words, the node optical transceivers 110 shown in FIG. 1 can be configured similarly to the node optical transceivers 210a-b shown in FIG. 2. Similarly, the router optical transceivers 208a-b shown in FIG. 2 can be representative of the router optical transceivers 108 shown in FIG. 1. In other words, the router optical transceivers 108 in the system 100 shown in FIG. 1 can be configured similarly to the router optical transceivers 208a-b in the system 200 shown in FIG. 2. In some embodiments, any two processing nodes 102 in the system 100 shown in FIG. 1 can communicate with each other in a manner that is similar to the way that the first processing node 202a and the second processing node 202b communicate with each other.

Of course, the specific configurations of the router optical transceivers 208a-b and the node optical transceivers 210a-b are provided for purposes of example only and should not be interpreted as limiting the scope of the present disclosure. An optical transceiver can be configured in many different ways in accordance with the present disclosure.

The light sources 220a-b, 222a-b shown in FIG. 2 can be any device that emits electromagnetic radiation in a form that can be used for optical communication. For example, the light sources 220a-b, 222a-b can be configured to emit light beams that can be modulated in order to transmit information. Some examples of light sources 220a-b, 222a-b that can be used include a laser, a light-emitting diode (LED), and an infrared-emitting diode (IRED).

The photodetectors 268a-b, 270a-b can be any device that is configured to convert light into an electrical signal. Some examples of photodetectors 268a-b, 270a-b include photodiodes and photo transistors.

The router optical transceivers 208a-b and the node optical transceivers 210a-b can also include one or more communication interfaces to one or more other devices. The router optical transceivers 208a-b can include one or more communication interfaces to the routing module 230 within the router 206. The node optical transceivers 210a-b can include one or more communication interfaces to a processing node. For example, the first node optical transceiver 210a can include a communication interface to the first processing node 202a, and the second node optical transceiver 210b can include a communication interface to the second processing node 202b.

As noted above, when the routing module 230 receives data from a particular processing node, the routing module 230 can determine the intended destination for the data. In some embodiments, the routing module 230 can determine the intended destination for the data based on information (e.g., an address) included within the data itself. Alternatively, the routing module 230 can determine the intended destination for the data based on information that is sent to the routing module 230 in another signal.

The routing module 230 can be implemented in a variety of different ways. For example, in some embodiments the routing module 230 can be implemented using one or more electrical crossbar switches. As another example, in some embodiments the routing module 230 can be implemented with one or more microelectromechanical systems (MEMS) devices that are configured to perform routing operations. As yet another example, in some embodiments the routing module 230 can be implemented using one or more prisms that are configured to perform the routing operations.

In the above discussion, it was assumed that the routing module 230 is electrically coupled to the router optical transceivers 208a-b. Alternatively, in some embodiments the routing module 230 can be optically coupled to the router optical transceivers 208a-b. For example, the routing module 230 can be optically coupled to the router optical transceivers 208a-b in embodiments where the routing module 230 is implemented with one or more MEMS devices and/or with one or more prisms. In such embodiments, it is not necessary for a modulated light beam to be converted into an electrical signal before being provided to the routing module 230. Instead, in such embodiments the routing module 230 can receive a modulated light beam from one node optical transceiver (e.g., the first node optical transceiver 210a) and simply redirect the modulated light beam to another node optical transceiver (e.g., the second node optical transceiver 210b) without converting it into an electrical signal.

In the example discussed above in connection with FIGS. 1 and 2, each node optical transceiver includes a light source. Thus, when a particular processing node sends data to the router, the light source in the node optical transceiver that is coupled to the processing node generates a light beam, which can then be modulated based on the data to be transmitted.

In the types of implementations described previously, there are a plurality of light sources in close proximity to the computing nodes. In some embodiments, however, this kind of architecture may not necessarily be desirable. In some situations, it may be advantageous for the light sources to be located elsewhere.

Figure 3:
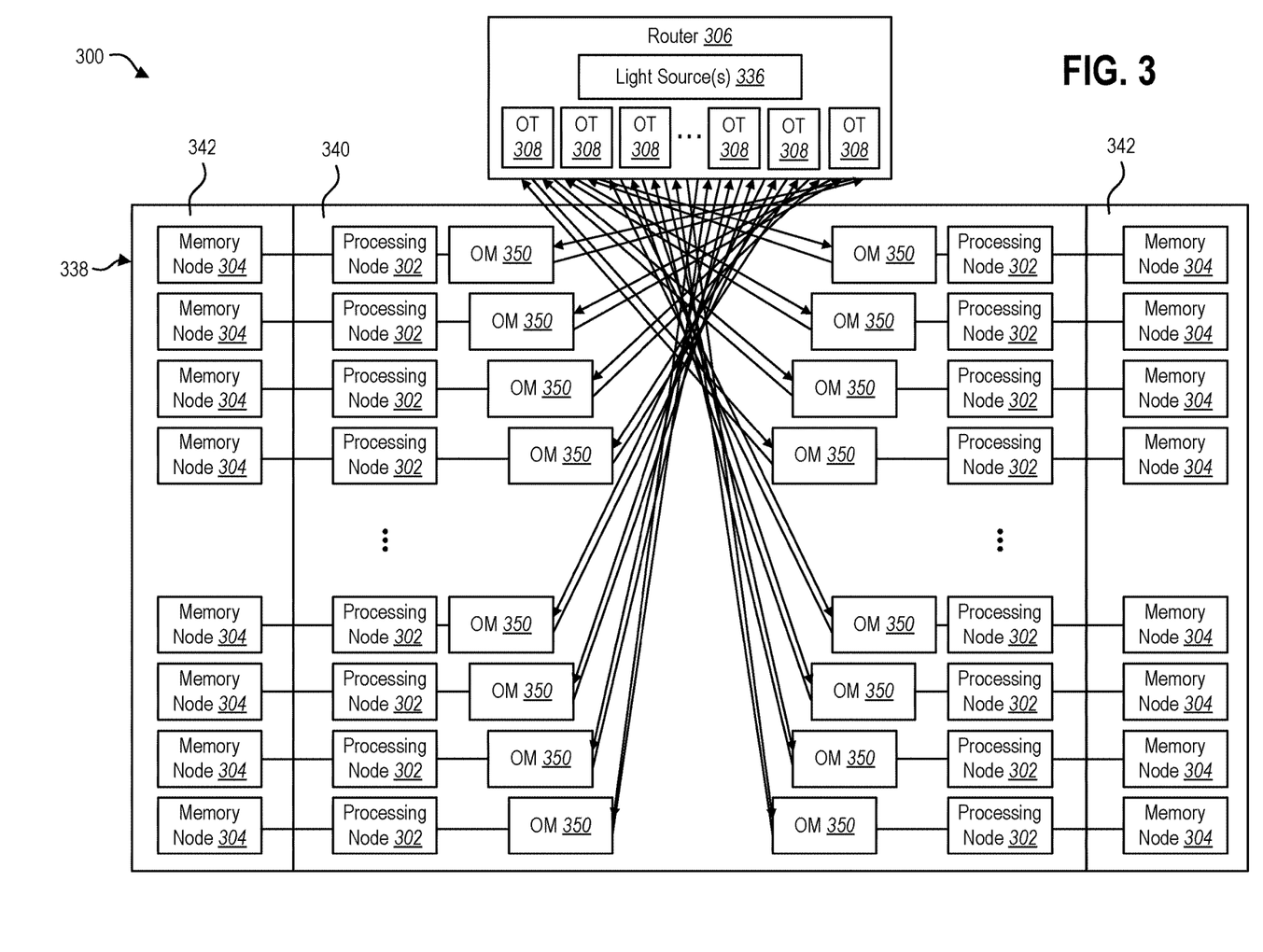
FIG. 3 illustrates another example of a system for using free-space optics to interconnect a plurality of computing nodes in accordance with the present disclosure, in which different types of computing nodes are located in different sections of an enclosure and light sources are located outside of the enclosure in order to minimize the amount of heat that is generated within the enclosure.

FIG. 3 illustrates another example of a system 300 in which the techniques disclosed herein can be utilized. More specifically, FIG. 3 illustrates another example of a system 300 for using free-space optics to interconnect a plurality of computing nodes in accordance with the present disclosure. In the depicted system 300, light sources are located separately from the computing nodes in order to minimize the amount of heat that is generated close to the computing nodes. Some potential benefits of this system architecture will be discussed below.

The system 300 shown in FIG. 3 is similar in several respects to the system 100 shown in FIG. 1. For example, the system 300 includes a plurality of computing nodes. In particular, the system 300 is shown with a plurality of processing nodes 302 and a plurality of memory nodes 304. In addition, the system 300 includes a router 306 that is coupled to a plurality of optical transceivers 308.

In the depicted system, however, the light sources that generate light beams for sending free-space optical communications from the processing nodes 302 to the router 306 are located at a distance from the processing nodes 302. In other words, unlike the system 100 shown in FIG. 1, the processing nodes 302 are not coupled to optical transceivers that include light sources. Instead, the processing nodes 302 are coupled to optical modules 350 that do not include light sources. Some potential benefits of this will be described below. The optical modules 350 are abbreviated as "OM" in FIG. 3.

Free-space optical communications can occur between the optical transceivers 308 that are coupled to the router 306 and the optical modules 350 that are coupled to the processing nodes 302. However, because the optical modules 350 do not include light sources, the way that free-space optical communications occur in the depicted system 300 is somewhat different from the way that free-space optical communications occur in the system 100 shown in FIG. 1.

More specifically, the optical modules 350 can receive free-space optical communications from the router 306 similarly to the way that the node optical transceivers 110 receive free-space optical communications from the router 106 in the system 100 shown in FIG. 1. However, because the optical modules 350 do not include light sources, the way that the optical modules 350 send free-space optical communications to the router 306 can be different from the way that the node optical transceivers 110 send free-space optical communications to the router 106 in the system 100 shown in FIG. 1.

To enable the optical modules 350 to send free-space optical communications to the router 306 in the depicted system 300, the router 306 itself can include one or more light sources 336 that generate light beams and aim the light beams at the optical modules 350. Each optical module 350 can include a modulator that is configured to modulate light beams received from the router 306, and an optics system for reflecting the modulated light beams back toward the router 306. An example of an optical module 350 will be discussed in greater detail below.

In FIG. 3, the light source(s) 336 are shown within the router 306. Alternatively, the light source(s) 336 can be separate from the router 306. In some embodiments, the light source(s) 336 can be separate from the router 306 and also coupled to the router 306. In some embodiments, the light source(s) 336 can be separate from the router 306 and not coupled to the router 306.

In some embodiments, the system 300 can be configured so that for each optical module 350 there is a corresponding optical transceiver 308 that is coupled to the router 306 and that is optically coupled to the optical module 350. The router 306, the optical transceivers 308 that are coupled to the router 306, and the optical modules 350 can all function together to interconnect the computing nodes to form a network fabric. Like the network fabric in the system 100 shown in FIG. 1, the network fabric in the depicted system 300 enables all of the computing nodes to be accessible to one another. For example, all of the memory nodes 304 can be accessible to all of the processing nodes 302 via the network fabric.

In the depicted system 300, the computing nodes are located within an enclosure 338. In some embodiments, the enclosure 338 can be a tank, such as a tank that can be utilized in a cryogenic computing system (which may be referred to herein as a cryogenic tank).

In general terms, cryogenics refers to the production and behavior of materials at extremely low temperatures. The effects of cryogenics on various aspects of computing systems is currently being studied. Some researchers have concluded that chips developed for operation in extremely low temperatures have significant advantages (e.g., are significantly faster than) over their conventional counterparts. With the increasing challenges in conventional approaches to improving performance of computing systems, some researchers believe that a significant change in the operating temperature of computing components (e.g., processors, memory) using cryogenic techniques can be important to the future development of computing systems. Because cryogenic computing systems will be designed to operate at extremely low temperatures, the computing nodes that operate in cryogenic computing systems can be located in tanks that are cooled to the desired temperature(s).

Of course, in some embodiments, the enclosure 338 shown in FIG. 3 can be implemented as something other than a cryogenic tank. For example, in some embodiments the enclosure 338 can be a rack, such as a server rack that is commonly used in datacenters. In other embodiments, the enclosure 338 can be another type of container, such as a tub, a vat, or the like.

As noted above, computing nodes that are developed for cryogenic computing systems can be designed to operate at extremely low temperatures. However, in a cryogenic computing system, some types of computing nodes may be able to operate at lower temperatures than other types of computing nodes. For example, processing nodes 302 in a cryogenic computing system can be designed to operate at extremely low temperatures, whereas memory nodes 304 in a cryogenic computing system can be designed to operate at somewhat higher temperatures.

In embodiments where the enclosure 338 is a cryogenic tank that is designed for use in a cryogenic computing system, the enclosure 338 can include different zones for different types of computing nodes. For example, in some embodiments the enclosure 338 can include a first zone 340 and a second zone 342. In FIG. 3, the processing nodes 302 are shown in the first zone 340 of the enclosure 338, and the memory nodes 304 are shown in the second zone 342 of the enclosure 338. The first zone 340 can be designed for an extremely low temperature, such as a temperature that would be suitable for processing nodes 302. The second zone 342 can be designed for a somewhat higher temperature, such as a temperature that would be suitable for memory nodes 304. As a specific example, in some embodiments the first zone 340 of the enclosure 338 can be designed for a temperature of about 4 K, and the second zone 342 of the enclosure 338 can be designed for a temperature of about 77 K.

Light sources can generate significant amounts of heat. Therefore, having the processing nodes 302 coupled to optical modules 350 that do not include light sources makes it easier to maintain the first zone 340 of the enclosure 338 at an extremely low temperature that would be suitable for processing nodes 302 in a cryogenic computing system. If the optical modules 350 included light sources (like the node optical transceivers 110 in the system 100 shown in FIG. 1), then this would add a significant amount of heat to the first zone 340 of the enclosure 338 and therefore increase the cost of cooling the first zone 340 of the enclosure to the desired temperature.

The above discussion focused on one potential benefit of having the processing nodes 302 coupled to optical modules 350 that do not include light sources, and this benefit was specifically associated with a cryogenic computing system. However, this kind of architecture can be utilized in embodiments that do not involve cryogenic computing systems. For example, even if the system 300 were designed so that all of the computing nodes (e.g., processing nodes 302 and memory nodes 304) operate at the same temperature (e.g., room temperature), it could still be beneficial to have the processing nodes 302 coupled to optical modules 350 that do not include light sources and utilize external light sources 336 instead. For example, the reduction of heat that results from utilizing optical modules 350 instead of node optical transceivers 110 could improve the performance of the processing nodes 302.

Figure 4:
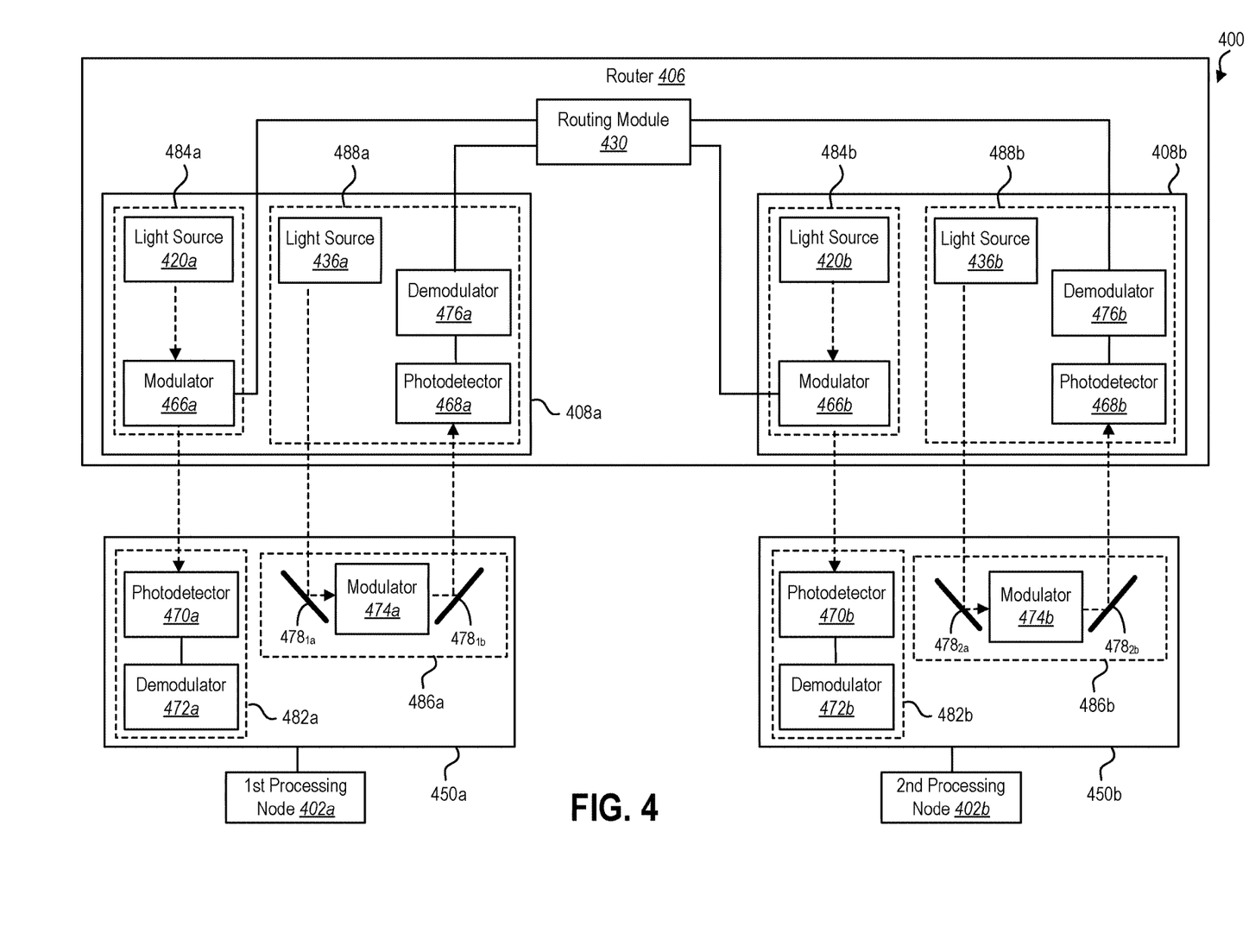
FIG. 4 illustrates an example showing how free-space optical communication can occur between a first processing node and a second processing node in a system that is configured like the system shown in FIG. 3.

FIG. 4 illustrates an example showing how free-space optical communications can occur among a plurality of computing nodes. The example will be described in relation to a system that is configured like the system 300 shown in FIG. 3. The various components shown in FIG. 4 are examples of possible implementations of the corresponding components in the system 300 shown in FIG. 3.

For the sake of simplicity, the depicted example involves communication between a first processing node 402a and a second processing node 402b. The first processing node 402a is coupled to a first optical module 450a, and the second processing node 402b is coupled to a second optical module 450b. The router 406 includes a plurality of optical transceivers, including a first optical transceiver 408a and a second optical transceiver 408b. For purposes of the present example, it will be assumed that the first optical transceiver 408a is optically coupled to the first optical module 450a, and the second optical transceiver 408b is optically coupled to the second optical module 450b.

The first optical module 450a and the second optical module 450b can both include a receiving module that is configured to receive free-space optical communications from the router 406. In particular, the first optical module 450a can include a receiving module 482a, and the second optical module 450b can include a receiving module 482b. The receiving module 482a in the first optical module 450a can include a photodetector 470a and a demodulator 472a. The receiving module 482b in the second optical module 450b can include a photodetector 470b and a demodulator 472b.

The first optical transceiver 408a and the second optical transceiver 408b can both include a transmitting module that is configured to transmit free-space optical communications to the first optical module 450a and the second optical module 450b, respectively. In particular, the first optical transceiver 408a can include a transmitting module 484a, and the second optical transceiver 408b can include a transmitting module 484b. The transmitting module 484a in the first optical transceiver 408a can include a light source 420a and a modulator 466a. The transmitting module 484b in the second optical transceiver 408b can include a light source 420b and a modulator 466b.

The transmitting module 484a in the first optical transceiver 408a and the receiving module 482a in the first optical module 450a can enable the router 406 to send data to the first processing node 402a. More specifically, the light source 420a in the first optical transceiver 408a can generate a light beam that is aimed at the photodetector 470a in the first optical module 450a. The light beam can be modulated by the modulator 466a based on a modulating signal that includes the data to be transmitted. The photodetector 470a in the first optical module 450a can detect the modulated light beam and convert it into an electrical signal. The demodulator 472a in the first optical module 450a can be configured to extract the data from the electrical signal that is produced by the photodetector 470a. This data can then be provided to the first processing node 402a.

In a similar manner, the transmitting module 484b in the second optical transceiver 408b and the receiving module 482b in the second optical module 450b can enable the router 406 to send data to the second processing node 402b. More specifically, the light source 420b in the second optical transceiver 408b can generate a light beam that is aimed at the photodetector 470b in the second optical module 450b. The light beam can be modulated by the modulator 466b based on a modulating signal that includes the data to be transmitted. The photodetector 470b in the second optical module 450b can detect the modulated light beam and convert it into an electrical signal. The demodulator 472b in the second optical module 450b can be configured to extract the data from the electrical signal that is produced by the photodetector 470b. This data can then be provided to the second processing node 402b.

The first optical module 450a and the second optical module 450b can both include a transmitting module that is configured to send free-space optical communications to the router 406. In particular, the first optical module 450a can include a transmitting module 486a, and the second optical module 450b can include a transmitting module 486b. The transmitting module 486a in the first optical module 450a can include a modulator 474a and an optics system, which can include mirrors $478_{1a}$, $478_{1b}$. Similarly, the transmitting module 486b in the second optical module 450b can include a modulator 474b and an optics system, which can include mirrors $478_{2a}$, $478_{2b}$.

The first optical transceiver 408a and the second optical transceiver 408b can both include a receiving module that is configured to receive free-space optical communications from the first optical module 450a and the second optical module 450b, respectively. In particular, the first optical transceiver 408a can include a receiving module 488a, and the second optical transceiver 408b can include a receiving module 488b. The receiving module 488a in the first optical transceiver 408a can include a light source 436a, a photodetector 468a, and a demodulator 476a. The receiving module 488b in the second optical transceiver 408b can include a light source 436b, a photodetector 468b, and a demodulator 476b.

The transmitting module 486a in the first optical module 450a and the receiving module 488a in the first optical transceiver 408a can enable the first processing node 402a to send data to the router 406. More specifically, the light source 436a in the receiving module 488a can aim a light beam at the first optical module 450a. The optics system in the transmitting module 486a can direct the light beam toward the modulator 474a. In the depicted example, a mirror $478_{1a}$ reflects the light beam in the direction of the modulator 474a. The modulator 474a can modulate the light beam based on a modulating signal that includes the data to be transmitted, thereby producing a modulated light beam. The optics system in the transmitting module 486a can direct the modulated light beam toward the first optical transceiver 408a at the router 406, which (as noted above) is optically coupled to the first optical module 450a in this example. In the depicted example, a mirror $478_{1b}$ reflects the modulated light beam in the direction of the photodetector 468a in the receiving module 488a. The photodetector 468a in the receiving module 488a can detect the modulated light beam and convert it into an electrical signal. The demodulator 476a in the receiving module 488a can extract the data from the electrical signal that is produced by the photodetector 468a. This data can then be provided to a routing module 430 within the router 406.

Similarly, the transmitting module 486b in the second optical module 450b and the receiving module 488b in the second optical transceiver 408b can enable the second processing node 402b to send data to the router 406. More specifically, the light source 436b in the receiving module 488b can aim a light beam at the second optical module 450b. The optics system in the transmitting module 486b can direct the light beam toward the modulator 474b. In the depicted example, a mirror $478_{2a}$ reflects the light beam in the direction of the modulator 474b. The modulator 474b can modulate the light beam based on a modulating signal that includes the data to be transmitted, thereby producing a modulated light beam. The optics system in the transmitting module 486b can direct the modulated light beam toward the second optical transceiver 408b at the router 406, which (as noted above) is optically coupled to the second optical module 450b in this example. In the depicted example, a mirror $478_{2b}$ reflects the modulated light beam in the direction of the photodetector 468b in the receiving module 488b. The photodetector 468b in the receiving module 488b can detect the modulated light beam and convert it into an electrical signal. The demodulator 476b in the receiving module 488b can extract the data from the electrical signal that is produced by the photodetector 468b. This data can then be provided to the routing module 430 within the router 406.

An example involving a communication from the first processing node 402a to the second processing node 402b will now be described. In this example, it will be assumed that the first processing node 402a has data to send to the second processing node 402b.

When the first processing node 402a has data to send to the second processing node 402b, the transmitting module 486a in the first optical module 450a can send the data to the receiving module 488a in the first optical transceiver 408a in the manner described above. Along with the data, the transmitting module 486a can also send the receiving module 488a an indication of the intended destination for the data, which is the second processing node 402b in this example. The receiving module 488a can provide the data and the indication of the intended destination for the data to the routing module 430. The routing module 430 can then provide the data to the optical transceiver that corresponds to the intended destination for the data, which in this example is the second optical transceiver 408b. The transmitting module 484b in the second optical transceiver 408b can send the data to the receiving module 482b in the second optical module 450b in the manner described above. The second optical module 450b can then provide the data to the second processing node 402b.

The second processing node 402b can also send data to the first processing node 402a in a similar manner. When the second processing node 402b has data to send to the first processing node 402a, the transmitting module 486b in the second optical module 450b can send the data to the receiving module 488b in the second optical transceiver 408b in the manner described above. Along with the data, the transmitting module 486b can also send the receiving module 488b an indication of the intended destination for the data, which is the first processing node 402a in this example. The receiving module 488b can provide the data and the indication of the intended destination for the data to the routing module 430. The routing module 430 can then provide the data to the optical transceiver that corresponds to the intended destination for the data, which in this example is the first optical transceiver 408a. The transmitting module 484a in the first optical transceiver 408a can send the data to the receiving module 482a in the first optical module 450a in the manner described above. The first optical module 450a can then provide the data to the first processing node 402a.

In some embodiments, the optical modules 450a-b shown in FIG. 4 can be representative of the optical modules 350 shown in FIG. 3. In other words, the optical modules 350 in the system 300 shown in FIG. 3 can be configured similarly to the optical modules 450a-b shown in FIG. 4. Similarly, the optical transceivers 408a-b shown in FIG. 4 can be representative of the optical transceivers 308 shown in FIG. 3. In other words, the optical transceivers 308 in the system 300 shown in FIG. 3 can be configured similarly to the optical transceivers 408a-b in the system 400 shown in FIG. 4. In some embodiments, any two processing nodes 302 in the system 300 shown in FIG. 3 can communicate with each other in a manner that is similar to the way that the first processing node 402a and the second processing node 402b communicate with each other.

In the system 300 shown in FIG. 3, the light sources 336 are shown separately from the optical transceivers 308. In some embodiments, however, the light sources 336 can be included within the optical transceivers 308. For example, in the example shown in FIG. 4, the light sources 436a-b are shown as part of the optical transceivers 408a-b.

Of course, the specific configurations of the first optical module 450a, the second optical module 450b, the first optical transceiver 408a, and the second optical transceiver 408b are provided for purposes of example only and should not be interpreted as limiting the scope of the present disclosure. An optical module and an optical transceiver can be configured in many different ways in accordance with the present disclosure.

In the depicted embodiment, the transmitting modules 486a-b in the optical modules 450a-b each include an optics system, and each optics system includes mirrors. More specifically, the optics system in the transmitting module 486a includes mirrors $478_{1a}$, $478_{1b}$, and the optics system in the transmitting module 486b includes mirrors $478_{2a}$, $478_{2b}$. In alternative embodiments, however, other kinds of optical components (e.g., lenses, gratings) can be used in the optics systems. These other optical components can be used in addition to or instead of mirrors.

The routing module 430 can be implemented similarly to the routing module 230 discussed above in connection with FIG. 2. For example, the routing module 430 can be implemented using one or more electrical crossbar switches, one or more MEMS devices, one or more prisms, etc. In embodiments where the routing module 430 is implemented with one or more MEMS devices and/or with one or more prisms, it is not necessary for the modulated light beams detected by the photodetectors 468a-b to be converted into electrical signals.

Figure 5:
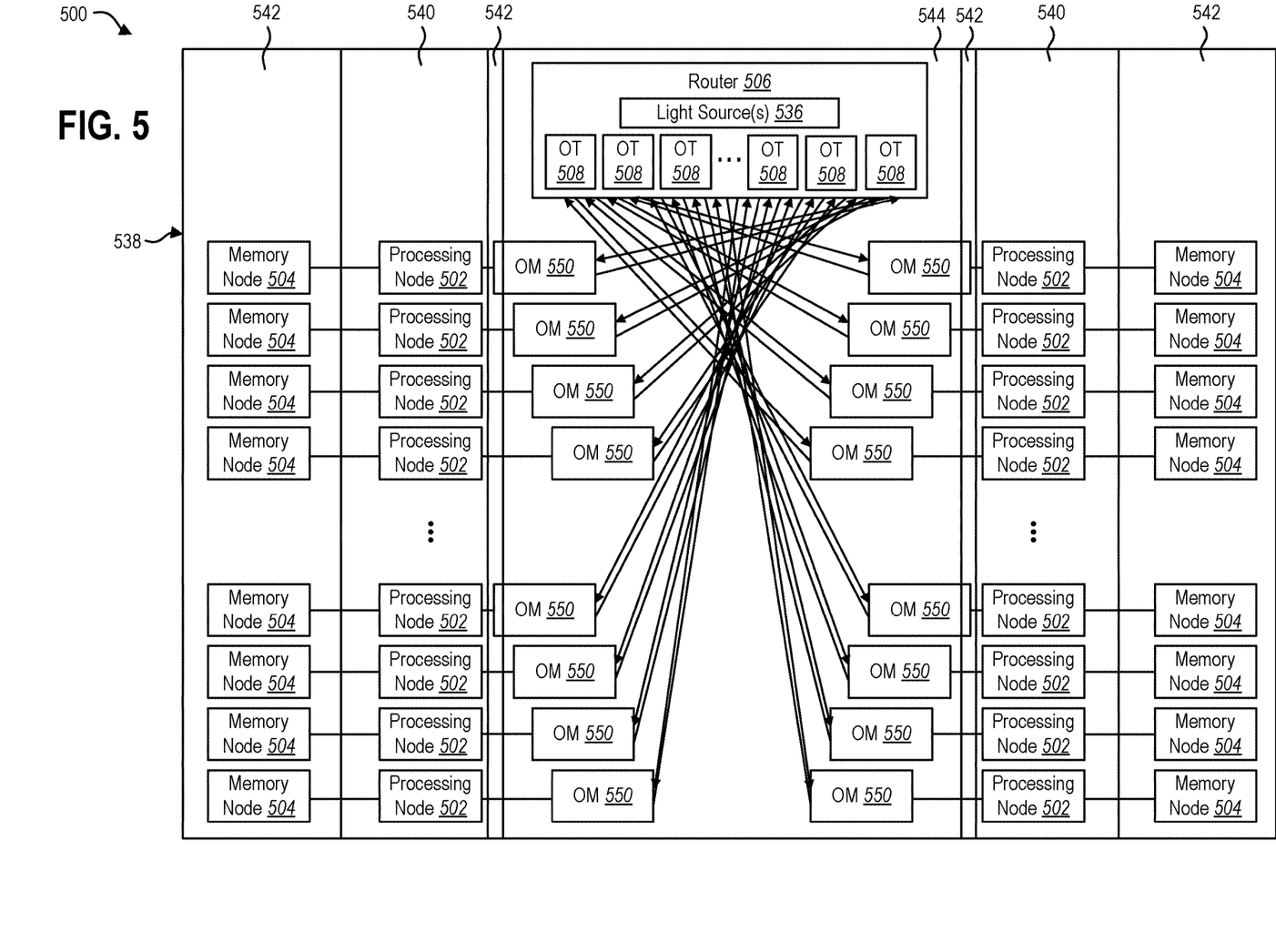
FIG. 5 illustrates another example of a system for using free-space optics to interconnect a plurality of computing nodes in accordance with the present disclosure, in which different types of computing nodes are located in different sections of an enclosure and light sources are located within a section of the enclosure that is maintained at room temperature.

FIG. 3, which was discussed above, represents one example of a system 300 in which light sources are located separately from the computing nodes. However, there are many other possible ways that such a system could be designed. FIG. 5 illustrates another example of a system 500 for using free-space optics to interconnect a plurality of computing nodes in which light sources are located separately from the computing nodes.

The system 500 is similar in several respects to the system 300 shown in FIG. 3. For example, the system 500 includes a plurality of computing nodes. In particular, the system 500 is shown with a plurality of processing nodes 502 and a plurality of memory nodes 504. In addition, the system 500 includes a router 506 that is coupled to a plurality of optical transceivers 508. The processing nodes 502 are electrically coupled to optical modules 550, which in the depicted embodiment do not include light sources. To enable the optical modules 550 to send free-space optical communications to the router 506, the router 506 includes one or more light sources 536 that generate light beams and aim the light beams at the optical modules 550. The computing nodes are located within an enclosure 538. The enclosure can include different zones for different types of computing nodes.

In the depicted example, the enclosure includes three different zones: a first zone 540, a second zone 542, and a third zone 544. The processing nodes 502 are shown in the first zone 540 of the enclosure 538. The memory nodes 504 are shown in the second zone 542 of the enclosure 538. The router 506, including the light sources 536 and the optical transceivers 508, are shown in the third zone 544 of the enclosure 538. The optical modules 550 are mostly in the third zone 544 of the enclosure 538, although some parts of some of the optical modules 550 are located in the second zone 542.

In some embodiments, the enclosure 538 can be a cryogenic tank that is designed for use in a cryogenic computing system. As discussed above, in a cryogenic computing system some types of computing nodes may be able to operate at lower temperatures than other types of computing nodes. In some embodiments, the first zone 540 can be designed for an extremely low temperature, such as a temperature that would be suitable for processing nodes 502. The second zone 542 can be designed for a somewhat higher temperature, such as a temperature that would be suitable for memory nodes 504. The third zone 544 can be designed for room temperature. As a specific example, in some embodiments the first zone 540 of the enclosure 538 can be designed for a temperature of about 4 K, the second zone 542 of the enclosure 538 can be designed for a temperature of about 77 K, and the third zone 544 of the enclosure 538 can be designed for a temperature of about 300 K.

Because the third zone 544 of the enclosure 538 can be designed for room temperature, the router 506 can be located inside the third zone 544. In the system 300 shown in FIG. 3, the router 306 is positioned outside of the enclosure 338 because the router 306 includes light sources (the light sources 336 that aim light beams at modulators within the optical modules 350, as well as light sources within the optical transceivers 308) that generate significant amounts of heat. In the embodiment shown in FIG. 3, the entire enclosure 338 is maintained below room temperature. As explained above, if the router 306 (including its light sources) were located inside the enclosure 338, this would increase the cost of cooling the enclosure 338. Therefore, in the system 300 shown in FIG. 3, it can be beneficial to locate the router 306 outside of the enclosure 338. In contrast, in the system 500 shown in FIG. 5, the third zone 544 of the enclosure 538 can be maintained at room temperature. Because the third zone 544 of the enclosure 538 is not being cooled, the router 506 (including its light sources) can be located inside the enclosure 538.

In some embodiments, a "network fabric" refers to a computer network architecture in which a plurality of computing systems or computing nodes are interconnected. In some embodiments, the computing systems or computing nodes in a network fabric can be interconnected using routers, switches, and other kinds of network components. In some embodiments, the computing systems or computing nodes in a network fabric can be interconnected in a way that provides low latency and/or high bandwidth interconnections between the various computing systems or computing nodes. In some embodiments, the computing systems or computing nodes in a network fabric can be interconnected using relatively few layers (e.g., two or three layers). This essentially flattens the network architecture, thereby reducing the distance between endpoints.

In some embodiments, two components are "coupled" if they are electrically coupled, optically coupled, or mechanically coupled.

In some embodiments, two components are "electrically coupled" if electrical current can flow from one component to another. In some embodiments, two electrically coupled components can be in direct contact with each other such that current flows from the one component directly to the other component. However, this is not required. In some embodiments, two electrically coupled components may not be in direct contact with each other. There may be any number of other conductive materials and components disposed electrically between two components that are electrically coupled so long as current can flow therebetween.

In some embodiments, two optical components are "optically coupled" if there is an optical path between the two optical components. Thus, in such embodiments, a first optical component (e.g., a node optical transceiver 110) can be considered to be optically coupled to a second optical component (e.g., a router optical transceiver 108) if an optical transmission sent by the first component is received by the second optical component.

In some embodiments, two optical components are "optically aligned" if there is a direct optical path between the two optical components that does not require any intervening optical elements that redirect the path of an optical transmission between the two optical components. In some embodiments, a first optical component (e.g., a transmitting module 284a in a router optical transceiver 208a) can be considered to be optically aligned with a second optical component (e.g., a receiving module 282a in a node optical transceiver 210a) if an optical transmission sent by the first component is received by the second optical component without the presence of any intervening optical components between the first optical component and the second optical component.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The described embodiments are to be considered as illustrative and not restrictive, and the present disclosure may be embodied in other forms besides those specifically described herein. The scope of the disclosure is, therefore, indicated by the appended claims rather than by the foregoing description. Changes that come within the meaning and range of equivalency of the claims are to be embraced within their scope.

What is claimed is:

1. A system for using free-space optics to interconnect a plurality of computing nodes, the plurality of computing nodes comprising a plurality of processing nodes and a plurality of memory nodes arranged so that the plurality of processing nodes are not electrically coupled to all of the plurality of memory nodes, the system comprising:
   a plurality of node optical transceivers that are electrically coupled to at least some of the plurality of computing nodes;
   a router that is configured to communicate with the plurality of computing nodes via free-space optical communications;
   a plurality of router optical transceivers that are coupled to the router, wherein the plurality of router optical transceivers are distinct from the plurality of node optical transceivers, wherein optical transmissions between the plurality of router optical transceivers and the plurality of node optical transceivers enable the free-space optical communications between the router and the plurality of computing nodes;
   a network fabric that interconnects the plurality of computing nodes so that the plurality of computing nodes are accessible to one another via the network fabric, the network fabric comprising the plurality of node optical transceivers, the plurality of router optical transceivers, and the router, the network fabric being configured so that all of the plurality of memory nodes are accessible to all of the plurality of processing nodes via the network fabric;
   a plurality of light sources, wherein the plurality of light sources comprise at least one distinct light source for each node optical transceiver among the plurality of node optical transceivers and for each router optical transceiver among the plurality of router optical transceivers; and
   a plurality of photodetectors, wherein the plurality of photodetectors comprise at least one distinct photodetector for each node optical transceiver among the plurality of node optical transceivers and for each router optical transceiver among the plurality of router optical transceivers.

2. The system of claim 1, wherein:
   the plurality of node optical transceivers are not electrically coupled to the router; and the plurality of router optical transceivers are not electrically coupled to the plurality of computing nodes.

3. The system of claim 1, wherein:
a first computing node is electrically coupled to a first node optical transceiver;
a first router optical transceiver is optically coupled to the first node optical transceiver;
a second computing node is electrically coupled to a second node optical transceiver;
a second router optical transceiver is optically coupled to the second node optical transceiver;
the first router optical transceiver is configured to receive a first modulated light beam from the first node optical transceiver and demodulate the first modulated light beam to extract data;
the router is configured to route the data to the second router optical transceiver; and
the second router optical transceiver is configured to transmit a second modulated light beam to the second node optical transceiver, the second modulated light beam comprising the data.

4. The system of claim 1, wherein the router comprises at least one of:
an electrical crossbar switch that performs routing operations;
a microelectromechanical systems (MEMS) device that performs the routing operations; and
a prism that performs the routing operations.

5. A system for using free-space optics to interconnect a plurality of computing nodes, comprising:
a router that is configured to communicate with the plurality of computing nodes via free-space optical communications;
a plurality of optical modules that do not comprise any light sources and that are electrically coupled to at least some of the plurality of computing nodes, each optical module among the plurality of optical modules comprising a modulator and an optics system;
a plurality of optical transceivers that are coupled to the router, wherein the plurality of optical transceivers facilitate the free-space optical communications with the plurality of optical modules, and wherein each optical module among the plurality of optical modules has a corresponding optical transceiver that is optically coupled to the optical module;
a first plurality of light sources that are separate from the plurality of optical modules and that enable the free-space optical communications from the router to the plurality of optical modules; and
a second plurality of light sources that are separate from the plurality of optical modules and that enable the free-space optical communications from the plurality of optical modules to the router, the modulator within a particular optical module being configured to modulate a light beam received from one of the second plurality of light sources to produce a modulated light beam, and the optics system within the particular optical module being configured to direct the modulated light beam toward the router.

6. The system of claim 5, wherein:
the plurality of optical modules, the plurality of optical transceivers, and the router interconnect the plurality of computing nodes to form a network fabric;
the plurality of computing nodes comprise a plurality of processing nodes and a plurality of memory nodes;
the plurality of processing nodes are not electrically coupled to all of the plurality of memory nodes; and
all of the plurality of memory nodes are accessible to all of the plurality of processing nodes via the network fabric.

7. The system of claim 5, wherein:
a first computing node is electrically coupled to a first optical module;
a first optical transceiver is optically coupled to the first optical module;
a second computing node is electrically coupled to a second optical module;
a second optical transceiver is optically coupled to the second optical module;
the first optical transceiver is configured to receive a first modulated light beam from the first optical module and demodulate the first modulated light beam to extract data;
the router is configured to route the data to the second optical transceiver; and
the second optical transceiver is configured to transmit a second modulated light beam to the second optical module, the second modulated light beam comprising the data.

8. A system for using free-space optics to interconnect a plurality of computing nodes that are located within an enclosure, comprising:
a router that is configured to route free-space optical communications among the plurality of computing nodes;
a plurality of processing nodes in a first zone of the enclosure;
a plurality of optical modules that are electrically coupled to at least some of the plurality of computing nodes;
a plurality of memory nodes in a second zone of the enclosure, wherein each memory node among the plurality of memory nodes is electrically coupled to at least one processing node among the plurality of processing nodes;
a plurality of optical transceivers that are coupled to the router, wherein the plurality of optical transceivers facilitate free-space optical communications with the plurality of optical modules, and wherein each optical module among the plurality of optical modules has a corresponding optical transceiver that is optically coupled to the optical module; and
at least one light source that is positioned outside of the first zone of the enclosure and that is configured to transmit light beams toward the plurality of optical modules.

9. The system of claim 8, wherein a first temperature of the first zone of the enclosure is lower than a second temperature of the second zone of the enclosure.

10. The system of claim 8, wherein the plurality of optical modules are located in the first zone of the enclosure.

11. The system of claim 8, wherein the plurality of optical modules are located in a third zone of the enclosure.

12. The system of claim 11, wherein:
a first temperature of the first zone of the enclosure is lower than a second temperature of the second zone of the enclosure; and
the second temperature is lower than a third temperature of the third zone of the enclosure.

13. The system of claim 8, wherein:
the plurality of optical modules, the plurality of optical transceivers, and the router interconnect the plurality of computing nodes to form a network fabric; and
the plurality of computing nodes are accessible to one another via the network fabric.

14. The system of claim 13, wherein:

the plurality of processing nodes are not electrically coupled to all of the plurality of memory nodes; and all of the plurality of memory nodes are accessible to all of the plurality of processing nodes via the network fabric.

15. The system of claim 8, wherein:

each optical module among the plurality of optical modules comprises a modulator and an optics system;

the modulator within a particular optical module is configured to modulate a light beam received from the at least one light source to produce a modulated light beam; and the optics system within the particular optical module is configured to direct the modulated light beam toward an optical transceiver among the plurality of optical transceivers.

16. The system of claim 8, wherein:

a first computing node is electrically coupled to a first optical module;

a first optical transceiver is optically coupled to the first optical module;

a second computing node is electrically coupled to a second optical module;

a second optical transceiver is optically coupled to the second optical module;

the first optical transceiver is configured to receive a first modulated light beam from the first optical module and demodulate the first modulated light beam to extract data;

the router is configured to route the data to the second optical transceiver; and the second optical transceiver is configured to transmit a second modulated light beam to the second optical module, the second modulated light beam comprising the data.

* * * * *